Aug. 18, 1931.  F. J. GAINER  1,819,745
FILTRATION OF TARS
Filed July 5, 1928
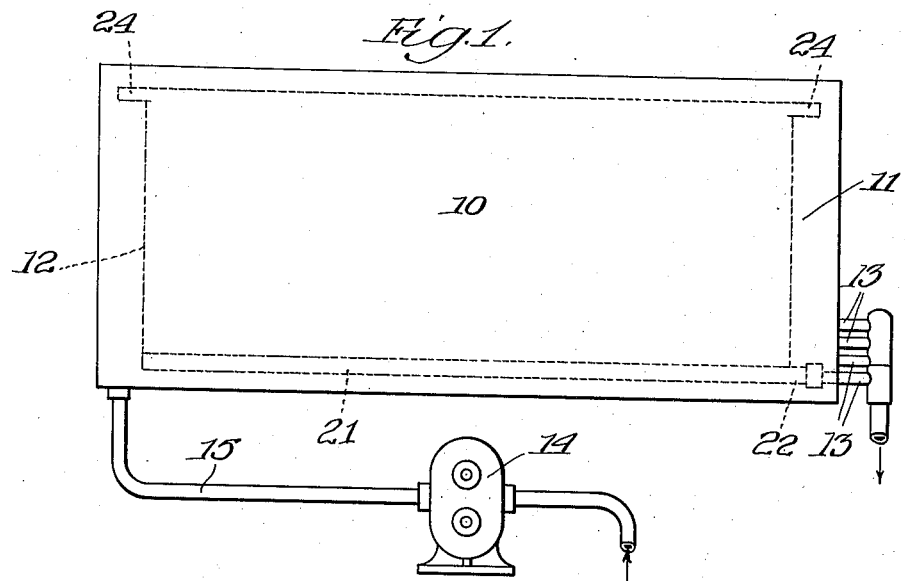
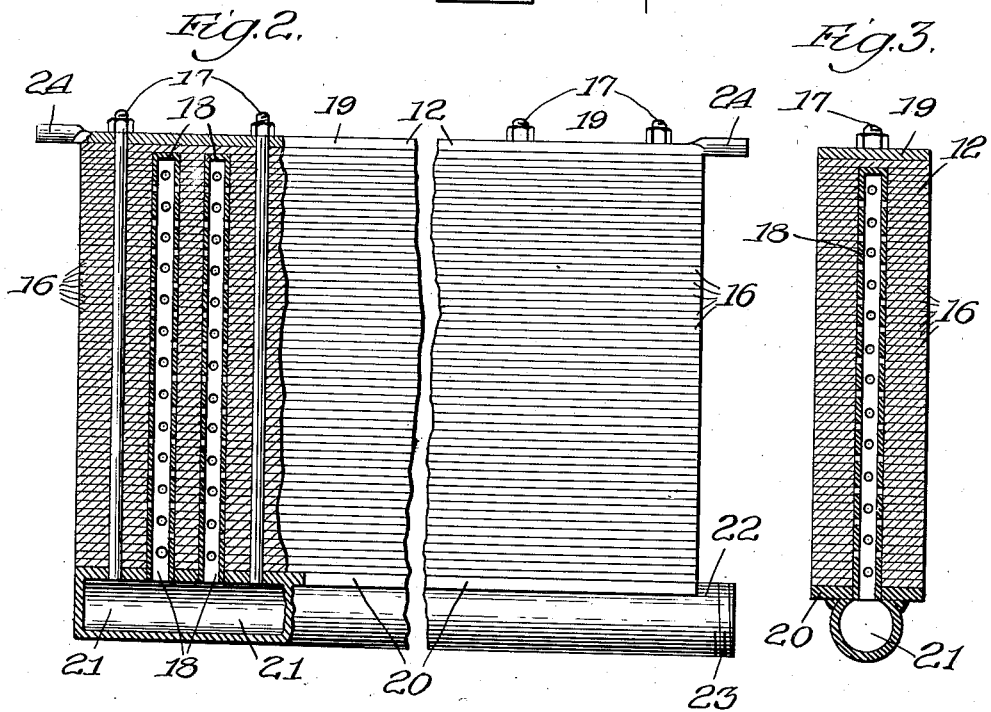
Inventor:
Frank J. Gainer,
By Dyrenforth, Lee, Chritton & Wiles
Att'ys Patented Aug. 18, 1931

1,819,745

UNITED STATES PATENT OFFICE

FRANK J. GAINER, OF WOODRIVER, ILLINOIS, ASSIGNOR TO STANDARD OIL COMPANY, OF WHITING, INDIANA, A CORPORATION OF INDIANA

FILTRATION OF TARS

Application filed July 5, 1928. Serial No. 290,426.

This invention relates to the filtration of tars, and particularly to the filtration of petroleum residues, such as pressure tars, which result from a cracking process operated at high temperatures and a substantial pressure.

In filtering such pressure tar so as to deprive same of a solid material, such as coke, calcium sulfide, etc., it has been found advantageous to employ asbestos as the filter medium and the present invention is particularly applicable where filtering surfaces of asbestos are employed.

The invention will readily be understood from the following description in conjunction with the accompanying drawings, in which—

Figure 1 is a diagrammatic view of a suitable filter press for filtering tar; Fig. 2 is an elevation, partly in section, of a suitable filter leaf; and Fig. 3 is a cross-sectional view of the leaf shown in Fig. 2.

Referring to the accompanying drawings, 10 is a filter press, preferably of the Kelly type, in which a chamber 11 contains a plurality of filter leaves 12, each of which is connected to liquid outlets 13 for the escape of filtered liquid. Liquid to be filtered is supplied to the chamber 11 by pump 14 through pipe 15.

The filter leaves 12 may suitably be of the type described and claimed in application, Serial No. 244,854, filed January 6, 1928 by myself and others. In this form of leaf, the asbestos filter medium may consist of superimposed strips 16 of asbestos board provided with alined openings for the reception of tie-rods 17 and perforated tubes 18. The block of filter medium thus formed is held compressed between pressure plates 19 and 20 by means of nuts on the upper ends of the tie-rods 17. The lower pressure plate 20 is provided with a trough 21 which leads into a pipe 22, provided with suitable means, for example, the threaded end 23, whereby it may be connected to one of the liquid outlets 13. Each filter leaf is provided with projections 24 for the purpose of support in position in the press.

The foregoing filter press leaf has been described as a suitable asbestos leaf for the application of the present invention. It is to be understood, however, that the invention is not limited to leaves of this construction since the present invention is applicable to asbestos filtering surfaces of all form.

In filtering pressure tar with asbestos filter leaves, it has been found that such leaves rapidly lose filtering power and that the removal of the cake therefrom is difficult.

I have now discovered that the life of asbestos plates can be enormously prolonged by the application of graphite to the outer surface thereof. The graphite may be applied in any suitable way, for example, by rubbing or by applying a suspension of graphite with brushes, or the like. I have found that the most satisfactory method of applying the graphite is by rubbing very finely divided dry graphite into the exterior surface of the asbestos leaves with the bare hand.

In actual practice it has been found that filter leaves treated in this manner, have an effective filtering life which is many times greater than that of filter leaves which are not thus treated. Furthermore, the cake of coke, and the like, which forms on the filter leaves is much more readily removed from the leaves treated with graphite than from the untreated leaves.

The filtering operation is conducted in the usual manner. That is, the tar, preferably at high temperature, is supplied by the pump 14 through the pipe 15 into the chamber 11 under high pressure. The liquid part of the tar is forced through the asbestos filter medium into the perforated tubes 18, from which it flows by the trough 21 into the pipes 13, by which it is conveyed to suitable receptacles. When the rate of filtration becomes slow, owing to the collection of solid material in the chamber 11, the chamber is opened and the cake is removed. After being used for about 20 to 25 days, it becomes necessary to thoroughly clean the filter leaves and apply graphite thereto. Periodic treatment of this character is necessary throughout the life of the filter leaf.

I claim:

1. The method of treating asbestos filter medium for use in filtering hot tars, which consists in applying graphite to the filtering surface of said medium.

2. The method of filtering hot tars, which consists in applying graphite to an external surface of a filter medium of asbestos and forcing said tars toward said surface and through said filter medium.

3. The method of filtering hot pressure tar, which consists in applying graphite to the filtering surface of an asbestos filter medium and forcing the liquid portions of the tar through said medium.

4. A filter medium for filtering hot pressure tars which comprises a body of asbestos having its surface which comes into direct contact with the hot tar to be filtered provided with a coating of graphite.

5. A filter medium for filtering hot pressure tars formed of asbestos, the filtering surface of which is provided with a coating of graphite.

6. The method of filtering hot pressure tars which comprises forcing said tars through an asbestos filtering medium, the surface of said medium which comes in direct contact with the tar to be filtered, being provided with a coating of graphite.

In testimony whereof, I have hereunto set my hand this 2nd day of July, 1928.

FRANK J. GAINER.